Patented Mar. 13, 1951

2,544,890

UNITED STATES PATENT OFFICE 2,544,890

DI-2-ETHYL-HEXYL DIGLYCOLLATE

Edward M. McMahon, Kingsport, Tenn., assignor to Eastman Kodak Company, Rochester, N. Y., a corporation of New Jersey No Drawing. Application May 7, 1948, Serial No. 25,795

1 Claim. (Cl. 260—484)

This invention relates to a new chemical compound, and more particularly to di-2-ethyl-hexyl diglycollate,

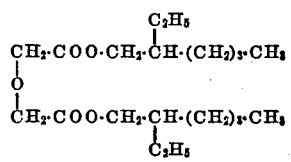

I have prepared this compound by heating one mol of diglycollic acid with two mols of 2-ethyl-hexyl alcohol, using toluene as entraining agent and a small amount of sulfuric acid as catalyst. After neutralization and washing, the toluene, water and excess alcohol were removed by distillation at water aspirator pressure. The residual ester was then distilled in a high-vacuum still. Di-2-ethyl-hexyl diglycollate was obtained as a slightly yellow oil having the following properties:

Boiling point: 138°–145° C. at 0.15 mm. Hg; 321° C. at 738 mm. Hg.
Density: $0.9664^{20}_{20}$
Refractive index $n_D^{20}$: 1.4460
Melting point: Below —60° C.

The ester can also be prepared as follows:
2280 g. (15 mols) of diglycollic acid and 4290 g. (30 mols plus 10% excess) of 2-ethyl-hexyl alcohol were mixed in a 12-liter flask fitted with an agitator and an automatic decanting reflux condenser, and the mixture was refluxed, with stirring, until 570 cc. of water of reaction had been collected. At this point the acid number had been lowered to 2 mg. KOH/gram of product. The batch was neutralized with a 5% solution of NaOH, and washed three times with water. Low-boiling substances were removed by distillation under reduced pressure. The residue was fractionated under vacuum. The yield of di-2-ethyl-hexyl diglycollate was 77%.

Di-2-ethyl-hexyl diglycollate is useful as a plasticizer for cellulose esters, particularly cellulose acetate-butyrate and cellulose acetate-propionate. With cellulose acetate-butyrate, compositions containing from 1 to 30 parts of this plasticizer per 100 parts of cellulose ester can be rolled on hot rolls without difficulty and with no signs of exudation, and give useful plastics with good permanence properties. With cellulose acetate-propionate, compositions containing from 8 to 55 parts of this plasticizer per 100 parts of cellulose ester can be rolled on hot rolls without difficulty and with no signs of exudation, and give useful plastics with good permanence properties.

What I claim as my invention and desire to be secured by Letters Patent of the United States is:

Di-2-ethyl-hexyl diglycollate, having the structure represented by the formula:

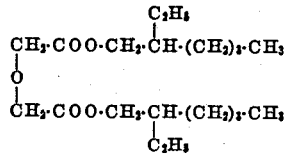

EDWARD M. McMAHON.

No references cited.